July 12, 1932. W. E. ZIEBER 1,866,991

REFRIGERATION

Filed Aug. 13, 1928

Inventor
William E. Zieber

Attorneys

Patented July 12, 1932

1,866,991

UNITED STATES PATENT OFFICE

WILLIAM E. ZIEBER, OF YORK, PENNSYLVANIA, ASSIGNOR TO YORK ICE MACHINERY CORPORATION, OF YORK, PENNSYLVANIA, A CORPORATION OF DELAWARE

REFRIGERATION

Application filed August 13, 1928. Serial No. 299,271.

This invention relates to refrigeration, and particularly to a method and apparatus for terminating the refrigerative action quickly, as is sometimes necessary in certain technical processes.

In freezing ice cream, it is essential, in order to secure the desired texture and volume, to arrest the freezing operation when the so-called swell commences, and it is essential that the cessation of the freezing operation be prompt and complete.

Various arrangements have heretofore been proposed, but none has proved entirely satisfactory. The present invention was developed in an effort to meet the requirements of ice cream manufacture, but it is not limited in its utility to that field.

Generally stated, I make use of a direct expansion evaporator which surrounds the ice cream freezer, and connect this evaporator with a receiver suction trap in such a way that the evaporator is maintained flooded. In other words, there is a liquid connection from the bottom of the trap to the bottom of the evaporator, and a vapor and pressure-equalizing connection from the top of the evaporator to the top of the trap.

When it is desired to arrest the refrigerative action the vapor and pressure-equalizing connection just mentioned is closed, and the evaporation of liquid refrigerant in the evaporator promptly develops pressure which displaces the liquid refrigerant from the evaporator and forces it back through the liquid connection to the trap.

No hot gas connection is necessary to accomplish this result, but in case of sustained shut-down of a particular freezer it is sometimes desirable to bleed hot gas through a pressure reducing valve from the high pressure line of the system to the jacket. The amount so bled is very small, so small that it exerts no disturbing effect. It is practicable, therefore, to allow this flow to occur at all times.

A plurality of evaporators may be connected in parallel to a single receiver suction trap.

A practical embodiment of the invention is illustrated, largely in diagram, in the accompanying drawing, in which,—

Figure 1:
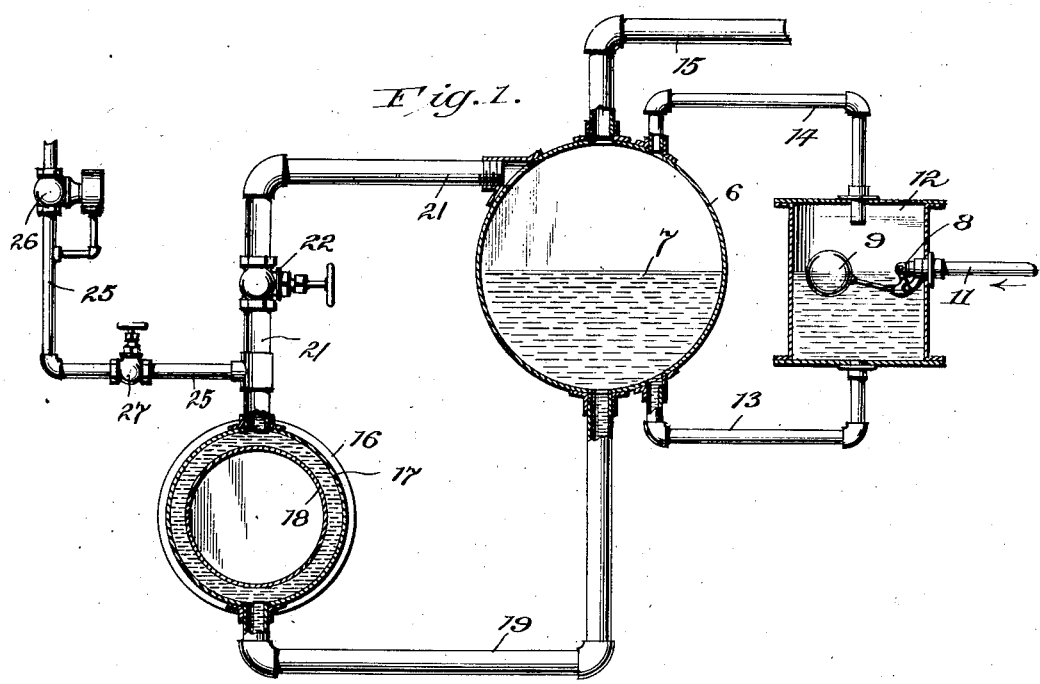
Fig. 1 is a vertical sectional view.
Figure 2:
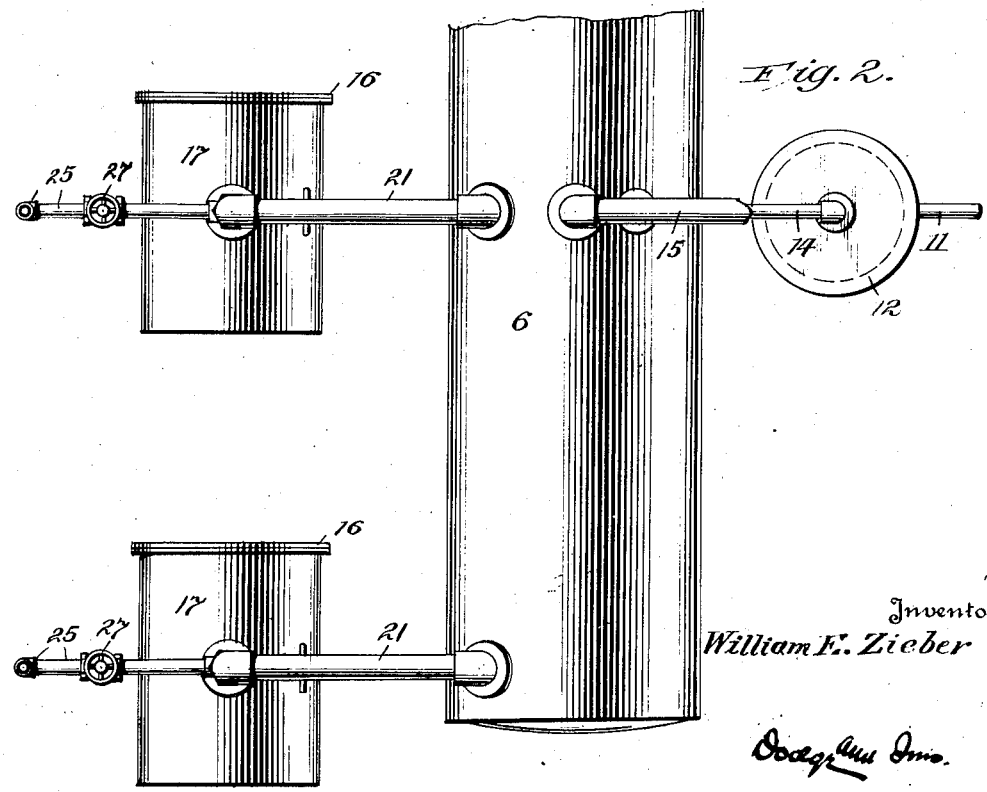
Fig. 2 is a fragmentary plan view showing a portion of a receiver suction trap with its float controlled feed and two evaporators connected in parallel to the trap.

In the drawing 6 represents an ordinary receiver suction trap in which the level of liquid refrigerant 7 is maintained by a valve 8 controlled by a float 9. The valve 8 controls the entrance of liquid refrigerant through a pipe 11 which leads from the condenser or from the high pressure receiver into which the condenser drains, if such a receiver is used.

The valve 8 and float 9 are mounted in a chamber 12 which has a liquid connection 13 and a pressure equalizing connection 14 with the receiver suction trap 6. Obviously, it would be possible to mount the float 9 and valve 8 directly in the trap 6 and to dispense with the chamber 12, but the arrangement shown is preferred because the restriction offered by the pipe 13 has the effect of steadying the action of the float 9.

The trap 6 is connected at its top by a pipe 15 with the suction of the usual compressor (not shown). The ice cream freezers, indicated at 16, may be of any suitable construction. The showing in the drawing is merely diagrammatic and includes an outer shell 17 and a concentric inner shell 18 which are spaced apart to form an intervening jacket space which serves as the evaporator, in which the liquid refrigerant boils. It will be understood that the batch of cream to be frozen is contained within the inner shell 18. It may be agitated in any suitable manner and its admission to and discharge from the space within the shell 18 may be controlled in any known manner.

Leading from the bottom of the trap 6 to the bottom of the jacket of each of the freezers 16 are separate liquid refrigerant lines 19. Each line enters the jacket of the corresponding freezer at the bottom. Leading from the top of each jacket is a vapor and pressure equalizing line 21, and the various vapor and pressure equalizing lines enter the receiver 6 above the level of liquid refrigerant in the receiver. It follows that the refrigerant in the top of the freezer 16 is normally subject to the suction pressure of the compressor, as is the refrigerant in the trap 6.

The pipe 21 is controlled by a stop valve 22, of ordinary form. When this valve is open, the refrigerant in the freezer jacket boils under suction pressure and the resulting vapor flows through the pipe 21 to the trap 6 and thence through the pipe 15 to the suction of the compressor. From the compressor it passes to the usual condenser where it is liquefied. The refrigerant thus liquefied flows either through a high pressure receiver to the pipe 11 or directly to the pipe 11 and returns to the trap 6. In the trap 6 it boils down to a temperature corresponding to the suction pressure maintained by the machines.

When the batch of cream in any freezer 16 commences to "swell" it is necessary to terminate the refrigerative action immediately. To produce this result the valve 22 is quickly closed. The refrigerant in the jacket continues to abstract heat from the batch and evaporation establishes sufficient pressure below the valve 22 and within the jacket to force the refrigerant from the jacket back through the pipe 19. The refrigerant so expelled accumulates in the receiver 6 and will temporarily raise the level therein slightly. When it is desired to resume the freezing operation the valve 22 is again opened.

The mechanism so far described will operate satisfactorily in the manner described, but where the freezers may be shut down for considerable periods, it is sometimes considered desirable to add means for insuring the continued displacement of liquid refrigerant.

This takes the form of a small pipe 25 which leads from the high pressure gas line, that is from the line from the compressor to the condenser, through a reducing valve 26 and throttling stop valve 27 to the pipe 21 between the valve 22 and the evaporator jacket. The purpose is to feed hot refrigerant gas at a pressure somewhat above the suction pressure in the trap 16 to the evaporator jacket. The reducing valve 26 performs the function of reducing the pressure, and the valve 27 is used to throttle the flow to a very minute quantity or to stop it altogether.

In the preferred operation the valve 27 is opened only when a freezer is to be shut down for a considerable period and then need be opened only very slightly, because the heat and pressure which will be furnished through a very small opening are sufficient to keep the jacket clear of liquid refrigerant continuously. In fact the amount of hot gas which is necessary to bleed through the valve 27 to perform this function is so small that it is negligible, and therefore it is never strictly necessary to close the valve 27. The hot gas arriving through the valve 27 has no appreciable effect on the refrigerative action, though, of course, it does reduce the efficiency in some degree. Thus while operation with the constant bleeding of hot gas is not recommended, it is technically possible. It is not so wasteful as to be prohibitive, and it is believed to fall within the broad scope of the present invention. It is expressly disclosed to avoid possible attempts at evasion.

The hot gas fed through the valve 27 is not sufficient in quantity to insure rapid displacement of the liquid refrigerant, as is evidenced by the fact that the admission or discharge of the refrigerant from the jacket is controlled by the opening and closing of the valve 22 regardless of whether the valve 27 is slightly open or completely closed.

The embodiment disclosed is intended merely as illustrative and all unnecessary or conventional details have been omitted in order to simplify the explanation of the invention. It is contemplated that in installing it various specifically different arrangements may be made and it is, of course, the purpose to take advantage of all known expedients in the art which might lead to refinements in manipulation or improved operative characteristics.

The member 6 is both a suction trap and a receiver, since it serves as a separator for liquid and vapor, as an interceptor for the liquid, and as a reservoir or receiver. If made large enough to contain, in liquid form, all the refrigerant in the system, it becomes what is known in the trade as a "receiver suction trap". Any suitable volume or reservoir may obviously be availed of and the terms "trap" and "receiver" are used in the claims in a general rather than in a limiting sense.

What is claimed is,—

1. The method of discharging refrigerant from a flooded evaporator having a liquid feed connection and a vapor connection, which consists in closing the vapor connection evaporating some of the liquid refrigerant and causing the refrigerant vapor thus formed to displace the liquid refrigerant from the evaporator through the liquid connection.

2. The method of discharging refrigerant from a flooded evaporator having a liquid feed connection and a suction connection, which consists in closing the suction connection evaporating some of the liquid refrigerant and causing the refrigerant vapor thus formed to displace the liquid refrigerant from the evaporator through the liquid connection, and thereafter maintaining such displacement by feeding gaseous refrigerant under pressure to said evaporator.

3. The method of operating a flooded evaporator having a liquid supply connection and a suction connection, which consists in feeding gaseous refrigerant to the suction connection at a restricted rate and at a pressure slightly higher than suction pressure, and causing the liquid refrigerant to enter or discharge from the evaporator at will by opening or closing said suction connection, the discharge of the refrigerant being effected by evaporation of liquid refrigerant in the evaporator and the consequent development of vapor pressure in the evaporator sufficient to displace the liquid refrigerant.

4. The combination with a suction trap, of an evaporator; a constantly open liquid supply connection from the bottom of the trap to the bottom of the evaprator; a vapor and pressure equalizing connection from the top of the evaporator to the top of the trap; means for closing said vapor and pressure equalizing connection; a suction connection leading from said suction trap and means for continuously furnishing gaseous refrigerant to said evaporator at a pressure higher than suction pressure and at a rate materially less than the suction off-flow from the evaporator.

5. The combination of a trap; means for maintaining a minimum liquid level therein; an evaporator; a liquid supply connection between the trap and bottom of the evaporator, said connection leading from a point below the liquid level in the trap; a suction and pressure equalizing connection between the upper portion of the evaporator and the vapor space in the trap; means for controlling the last-named connection; and a suction connection for withdrawing vapor from said trap.

6. The combination of a trap having a suction connection; means for feeding liquid refrigerant to said trap; an evaporator mounted at a level below said trap and having two connections so located that the evaporator will normally fill with liquid refrigerant by gravity flow from the trap, one of said connections being constantly open; and valve means controlling the other of said connections, and operable to regulate the displacement of liquid refrigerant from the evaporator by vapor pressure developed therein.

7. The method of controlling the refrigerative action of a flooded evaporator having a liquid feed connection and a vapor connection, which consists in varying the vapor pressure in the evaporator by controlling flow through the vapor connection, and permitting flow from the evaporator through the liquid feed connection of liquid refrigerant displaced by vapor under increased vapor pressure.

8. The method of controlling the refrigerative action of a normally flooded evaporator having two independent connections with a trap in which a charge of liquid refrigerant is maintained under suction pressure and from which the evaporator is fed by gravity, which consists in variably throttling one of said connections while vaporization of the refrigerant is taking place in the evaporator and causing the refrigerant vapor thus formed to displace and resist entrance of liquid refrigerant through the other connection to said trap in varying degree.

9. The method of controlling a flooded evaporator having a liquid supply connection and a suction connection, which consists in causing the liquid refrigerant to enter or discharge from the evaporator at will by opening or closing said suction connection, the discharge of the refrigerant being effected by evaporation of liquid refrigerant in the evaporator and the consequent development of vapor pressure in the evaporator sufficient to displace the liquid refrigerant.

10. The method of operating a flooded evaporator of the type having a suction connection and a liquid supply connection fed by gravity flow from a trap maintained at suction pressure, which consists in causing the liquid refrigerant to flow in reverse directions between the evaporator and the trap at will by opening and closing the suction connection from the evaporator, the flow of refrigerant to the trap being effected by evaporation of the liquid refrigerant in the evaporator and the consequent development of vapor pressure in the evaporator sufficient to displace the liquid refrigerant against the gravity flow tendency.

11. The combination of a suction trap; an evaporator; a liquid supply connection from the lower portion of the trap to the bottom of the evaporator; a suction and pressure-equalizing connection from the upper portion of the evaporator to the upper portion of the trap; means for supplying liquid refrigerant and serving to maintain in said trap a minimum liquid level which will normally assure substantial flooding of the evaporator by gravity flow from the trap; a suction connection for withdrawing vapor from said suction trap; and means for closing said suction and pressure-equalizing connection.

12. The combination of a suction trap; an evaporator; a liquid feeding connection, and a vapor and pressure equalizing connection between the trap and evaporator; a suction connection for withdrawing vapor from said trap; means for supplying liquid refrigerant serving to maintain in said trap a liquid level which normally will cause the evaporator to operate substantially flooded; and valve means controlling said vapor and pressure-equalizing connection, and operable to regulate the displacement of liquid refrigerant from the evaporator by vapor pressure developed therein.

13. A refrigerator unit comprising in combination, an evaporator portion arranged to absorb heat from the space to be refrigerated, and a trap portion substantially ineffective to absorb heat from such space, said portions being connected to form a closed refrigerant circuit by means of a liquid connection and a vapor connection; an automatic valve controlling the supply of liquid refrigerant to said circuit at a point outside said evaporator, said valve being responsive to liquid level in said trap portion and serving to maintain therein a minimum liquid level which normally ensures substantial flooding of the evaporator portion; valve means controlling said vapor connection; and a suction connection for withdrawing vapor from said trap portion regardless of the condition of the last-named valve means.

In testimony whereof I have signed my name to this specification.

WILLIAM E. ZIEBER.